(12) United States Patent
Sze et al.

(10) Patent No.: US 7,541,548 B1
(45) Date of Patent: *Jun. 2, 2009

(54) NUTRITION INTAKE TRACKER

(75) Inventors: Calvin Lui Sze, Austin, TX (US); Clifford Jay Spinac, Austin, TX (US); Glen Edmond Chalemin, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/235,567

(22) Filed: Sep. 22, 2008

Related U.S. Application Data

(63) Continuation of application No. 12/045,203, filed on Mar. 10, 2008, now Pat. No. 7,432,454.

(51) Int. Cl.
*G01G 19/40* (2006.01)
(52) U.S. Cl. .................. 177/25.16; 177/25.19; 128/921
(58) Field of Classification Search ................ 128/921; 177/25.16, 25.19
See application file for complete search history.

(56) References Cited

U.S. PATENT DOCUMENTS

| | | | | |
|---|---|---|---|---|
| 4,911,256 A | * | 3/1990 | Attikiouzel | 177/25.16 |
| 4,961,533 A | * | 10/1990 | Teller et al. | 177/25.19 |
| 5,033,561 A | * | 7/1991 | Hettinger | 177/25.16 |
| 5,388,043 A | | 2/1995 | Hettinger et al. | |
| 5,819,735 A | * | 10/1998 | Mansfield et al. | 600/300 |
| 5,890,128 A | * | 3/1999 | Diaz et al. | 705/2 |
| 6,283,914 B1 | * | 9/2001 | Mansfield et al. | 600/300 |
| 7,132,926 B2 | * | 11/2006 | Vaseloff et al. | 340/5.92 |
| 2002/0079142 A1 | * | 6/2002 | White | 177/25.16 |
| 2002/0137990 A1 | * | 9/2002 | Cardoso | 600/300 |
| 2003/0208110 A1 | * | 11/2003 | Mault et al. | 600/300 |
| 2004/0118618 A1 | * | 6/2004 | Davidson et al. | 177/25.13 |
| 2005/0184148 A1 | * | 8/2005 | Perlman | 235/383 |
| 2006/0074763 A1 | * | 4/2006 | Schmid | 705/26 |
| 2007/0026999 A1 | * | 2/2007 | Merolle et al. | 482/8 |
| 2007/0050058 A1 | * | 3/2007 | Zuziak et al. | 700/90 |
| 2007/0088746 A1 | * | 4/2007 | Baker | 707/104.1 |

* cited by examiner

*Primary Examiner*—Randy W Gibson
(74) *Attorney, Agent, or Firm*—Maxvalueip Consulting, LLC

(57) ABSTRACT

In one embodiment, this invention utilizes radio frequency identification (RFID) tag with nutrition information for each kind of food in a restaurant, institutional cafeteria, in food delivery to hospital patients, in hospice, in old age home residents or elsewhere. The food plate is placed on a coaster with an RFID reader and miniature built-in scale. The scale is used to measure the weight of a particular food placed on the plate. In addition, the RFID reader reads the nutritional information from an RFID tag in the serving bin of the cafeteria or the food distribution point. With the nutritional information of each food and the amount of the food that is added to the plate, the nutritional intake of a customer or patient can be calculated. With this the nutrition information now available, the nutritional information, including the amount of vitamins, calories, sugars, carbohydrates, and grams (g) of fat, can be obtained and tracked.

1 Claim, 3 Drawing Sheets

| Food A | Food B | Food C | Food D |
|---|---|---|---|
| 10 calories/g | 20 calories/g | 30 calories/g | 40 calories/g |
| 0.1 g of fat/g | 0.2 g of fat/g | 0.3 g of fat/g | 0.4 g of fat/g |

FIG 1

NUTRITION INTAKE TRACKER

This is a Cont. of another Accelerated Exam. application Ser. No. 12/045,203 now U.S. Pat. No. 7,432,454, filed Mar. 10, 2008, to be issued in September 2008, as a US patent, with the same title, inventors, and assignee, IBM.

BACKGROUND OF THE INVENTION

Today, people are more and more inclined towards health-conscientiousness. In particular, they would like to track how much nutrition, calories and fat they have consumed during the day or other specified time-period. However, there is no easy way to find out this information, especially when they eat out where there is no nutritional information available. Even if the information is made available to them, it is not convenient to convert the nutritional information to the number of calories or number of grams of fats that they have consumed because the amount of food they have consumed cannot be easily measured. Nonetheless, there have been several applications by which the individual can add consumed food data to a type of database for the purpose of determining to total intake. This information has been linked with health and work-out programs to create smart tools to, for example, better control their diets.

This embodiment provides a method and apparatus for a nutrition intake tracker which helps people easily record how much nutrition they have consumed at every meal throughout the day. This embodiment is especially important in medical facilities/hospitals and hospice/old age locations, where accurate and fast nutrition tracking can be very important for all the people who are receiving the food.

SUMMARY OF THE INVENTION

In one embodiment, this invention utilizes radio frequency identification (RFID) tag with nutrition information for each kind of food in a restaurant, institutional cafeteria, in food delivery to hospital patients, in hospice or in old age home residents, etc. The food plate is placed on a coaster with an RFID reader and miniature built-in scale. The scale is used to measure the weight of a particular food placed on the plate. In addition, the RFID reader reads the nutritional information from an RFID tag in the serving bin of the cafeteria or the food distribution point. With the nutritional information of each food and the amount of the food that is added to the plate, the nutritional intake of a customer or patient can be calculated. With this the nutrition information now available, the nutritional information, including the amount of vitamins, calories, sugars, carbohydrates, and grams (g) of fat can be obtained and tracked.

BRIEF DESCRIPTION OF THE DRAWINGS

FIG. 1 is an example of the nutritional information table for four different food items.

DETAILED DESCRIPTION OF THE PREFERRED EMBODIMENTS

Figure 2:
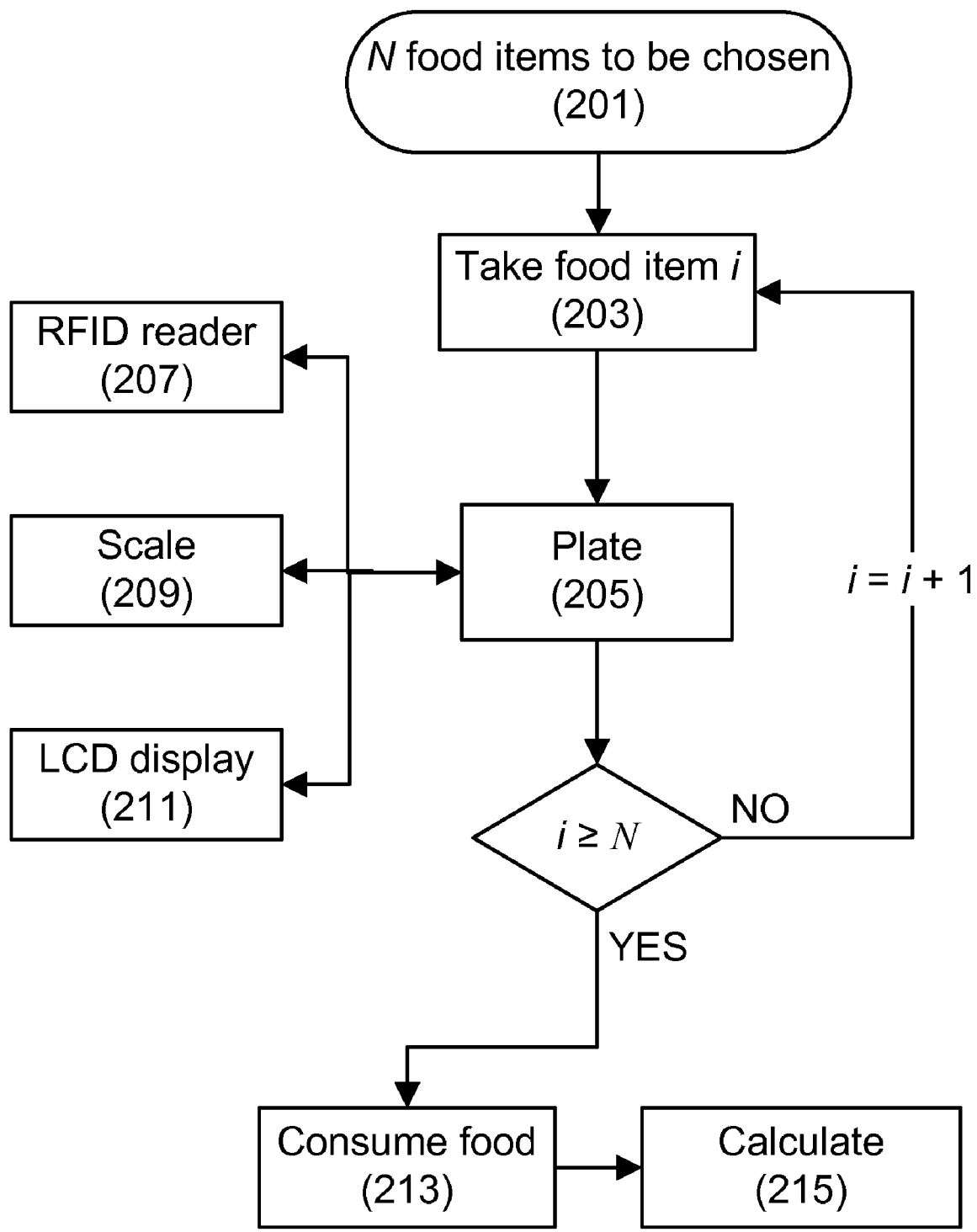
FIG. 2 is a data flow diagram showing the process of calculating the total nutrient intake of an individual.
Figure 3:
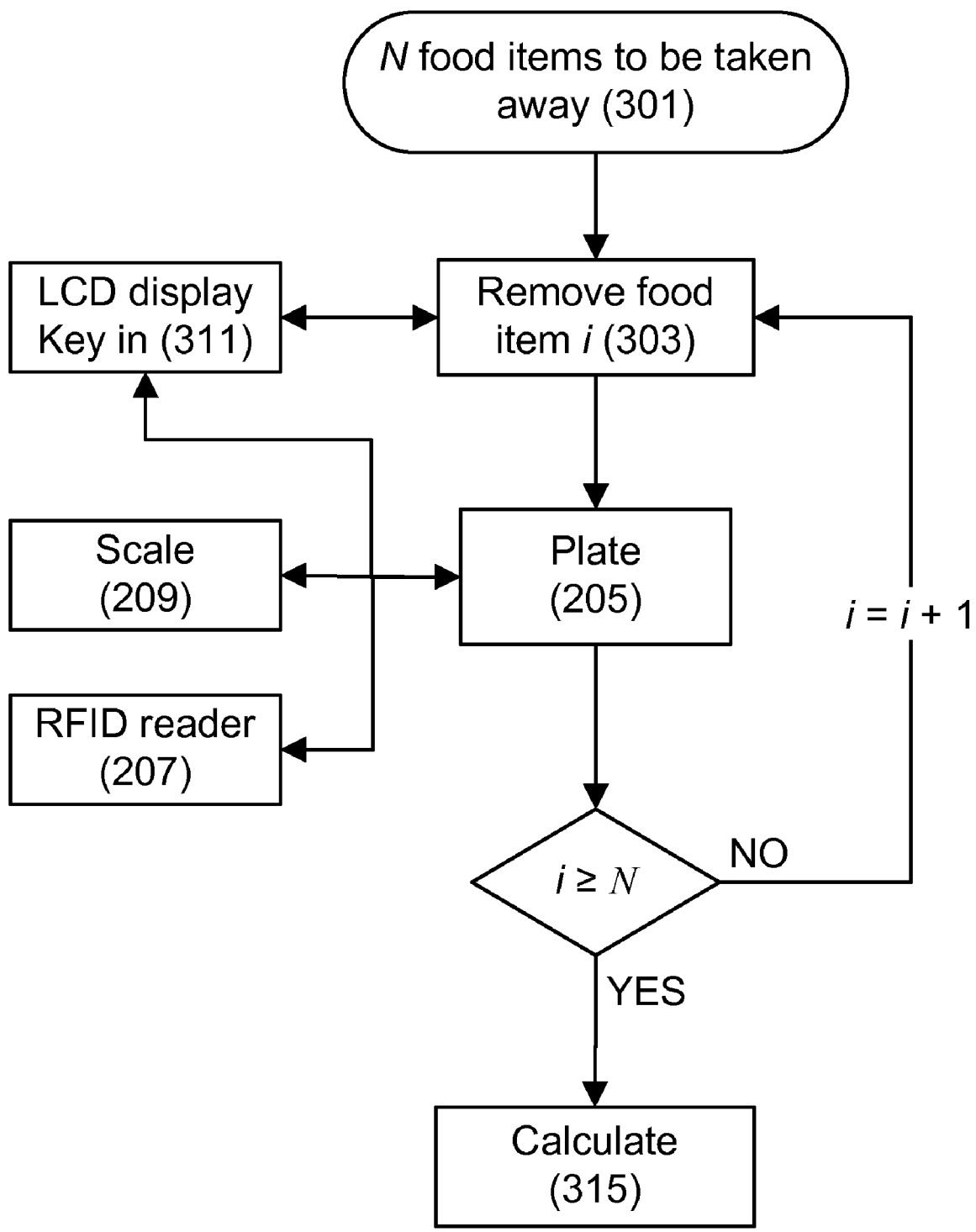
FIG. 3 is a data flow diagram showing the process of removing the nutrition value of left-over food from the total calculated nutrient intake value.

Radio frequency identification (RFID) tags are utilized by one embodiment of this invention to access nutrition information for each kind of food in a restaurant, institutional cafeteria (e.g. work place cafeteria, hospital cafeteria, etc), in food delivery to hospital patients, in hospice or in old age home residents, etc. The food plate is placed on a coaster with an RFID reader and miniature built-in scale. The weight of a particular food placed on the plate is measured using the scale. In addition, the nutritional information is read by the RFID reader from an RFID tag in the serving bin of the cafeteria or the food distribution point. With the nutritional information of each item of food and the amount of that item of food that is added to the plate, the nutritional intake of a customer or patient can be calculated. After this information is available, the total nutritional information, including the amount of vitamins, calories, sugars, carbohydrates, and grams (g) of consumed fat in the meal can be obtained and tracked.

The following steps describe one of the embodiments of this invention:

1. People enter a restaurant (201) that uses a serving buffet or a cafeteria, which has 4 kinds of foods as mentioned in FIG. 1.

2. Near each food tray, there is a RFID tag with the nutrition information mentioned in step 1.

3. People take a plate (205) and put the plate on a plate coaster which has a built-in RFID reader (207) and a miniature scale (209), along with a small LCD display (211).

4. When people want to add food A (203), they move the plate coaster near the RFID with food A's nutrition information. The built-in scale (211), then, for example measures that the customer selected 10 grams of food A.

5. Similarly, the customer adds 20 grams of food B and 30 grams of food C (203).

6. The LCD displays (211) the name of the food and nutrition information to the customer.

7. When the customer finishes the food on the plate (213), the coaster can calculate (215) how much calories and how much fat the customer has entered his/her body: (For selected foods A, B, and C)

$$10 \times 10(\text{food } A) + 20 \times 20(\text{food } B) + 30 \times 30(\text{food } C) = 1400 \text{ Calories.}$$

$$0.1 \times 10(\text{food } A) + 0.2 \times 20(\text{food } B) + 0.3 \times 30(\text{food } C) = 14 \text{ g of fat.}$$

8. For the non-buffet style restaurants, the waiter or waitress can obtain the nutrition information (by using the RFID or other manual methods) to the plate coaster and adding the food to the plate, before they take the food out to the customer. This can also be done by someone coordinating food delivery at a medical institution or hospital, an old age home, or a hospice.

There are ways to account for the left-over food. One example is the following:

1. The customer mentioned above has left-over food of type A and type B (301).

2. The customer selects food A on the LCD (311) indicating that the customer is going to take away food A (303).

3. After the customer removes (303) some or all of food A out of the plate (205), the scale (209) on the plate coaster shows that the mass of food A has decreased, for example, by 5 g, which means the customer has 5 g of left-over for food A.

4. Similarly the customer uses the same procedure to measure how much of food B has been left over: for instance, 10 g.

5. The plate coaster can now calculate (315) how much calories and fat the customer has actually consumed:

$$10 \text{ cal/g} \times (10 \text{ g} - 5 \text{ g left-over}) + 20 \text{ cal/g} \times (20 \text{ g} - 10 \text{ g left-over}) + 30 \text{ cal/g} \times 30 \text{ g} = 1150 \text{ Calories.}$$

$$0.1 \text{ g of fat/g} \times (10 \text{ g} - 5 \text{ g left-over}) + 0.2 \text{ g of fat/g} \times (20 \text{ g} - 10 \text{ g left-over}) + 0.3 \text{ g of fat/g} \times 30 \text{ g} = 11.5 \text{ g of fat.}$$

Therefore, in one embodiment of this invention, a method of nutrition intake tracking is presented. This method comprises of: placing a plate over a plate coaster, zeroing a scale via an electronic interface, placing the plate coaster within a first food dispensing area; transferring a first food portion of a first type of food from a first tray onto the plate, within the first food dispensing area, the plate coaster receiving a first nutritious information within the first food dispensing area via the RFID tag reader by reading a first RFID signal from a first RFID tag, calculating a first portion nutritious information based on the first weight and the first nutritious information, displaying the first portion nutritious information and the first nutritious information via the electronic interface, the plate coaster tracking one or more food portion nutritious information and the corresponding one or more food nutritious information, calculating a total portions nutritious information based on the one or more food portion nutritious information and the one or more food nutritious information, and displaying the total portions nutritious information via the electronic interface.

In one embodiment, the scale and the electronic interface are incorporated within the plate coaster and the plate coaster has an RFID tag reader. The scale measures a first weight of the first food portion by measuring a first weight increase of the plate and a content of the plate. The first RFID tag is associated with the first type of food served from the first tray and the first nutrition information is associated with the first type of food. The first nutritious information comprises a first per-weight calorie and a first per-weight fat. The first portion nutritious information comprises a first portion calorie amount and a first portion fat amount. The first portion nutritious information is one of the one or more food portion nutritious information, and the first nutritious information is one of the one or more food nutritious information. The total portions nutritious information comprises of total calorie information and total fat amount.

In one embodiment, if electing to indicate a first left-over food portion of the first food portion, the left-over food portion is removed from the plate, and the scale can then measure a first left-over weight of the left-over food portion by measuring a first weight reduction of the plate and the content of the plate, calculating a first left-over portion nutritious information based on the first left-over weight and the first nutritious information, calculating an adjusted total portions nutritious information based on the total portions nutritious information and the first left-over portion nutritious information, and finally, displaying the adjusted total portions nutritious information via the electronic interface.

A system, apparatus, or device comprising one of the following items is an example of the invention: food, food container, plates, weight, scale, measuring calorie, measurement device, RFID, antenna, tag, power supply, storage to store the messages, router, switches, network, communication media, cables, fiber optics, physical layer, buffer, nodes, packet switches, computer monitor, or any display device, applying the method mentioned above, for purpose of nutrition/diet/sport training/tracking and management.

Any variations of the above teaching are also intended to be covered by this patent application.

The invention claimed is:

1. A system of nutrition intake tracking, said system comprising:
   a plate coaster;
   a scale;
   wherein a single plate is placed over said plate coaster;
   wherein said scale is zeroed via an electronic interface;
   wherein said scale and said electronic interface are incorporated within said plate coaster;
   wherein said plate coaster has an RFID tag reader;
   wherein said plate coaster is placed within a first food dispensing area;
   wherein a first food portion of a first type of food is transferred from a first tray onto said plate, within said first food dispensing area;
   wherein said scale measures a first weight of said first food portion by measuring a first weight increase of said plate and a content of said plate;
   wherein said plate coaster receives a first nutritious information within said first food dispensing area via said RFID tag reader by reading a first RFID signal from a first RFID tag;
   wherein said first RFID tag is associated with said first type of food served from said first tray wherein said first RFID tag is associated with said first food dispensing area;
   wherein said first RFID tag is associated with said first food dispensing area;
   wherein said first nutritious information is associated with said first type of food;
   wherein said first nutritious information comprises a first per weight calorie and a first per weight fat;
   wherein a first portion nutritious information is calculated based on said first weight and said first nutritious information;
   wherein said first portion nutritious information comprises a first portion calorie amount and a first portion fat amount;
   wherein said first portion nutritious information and said first nutritious information are displayed via said electronic interface;
   wherein said plate coaster tracks one or more food portion nutritious information and corresponding one or more food nutritious information;
   wherein said first portion nutritious information is one of said one or more food portion nutritious information, and said first nutritious information is one of said one or more food nutritious information;
   wherein a total portions nutritious information is calculated based on said one or more food portion nutritious information and said one or more food nutritious information;
   wherein said total portions nutritious information comprises a total calorie information and a total fat amount;
   wherein said total portions nutritious information is displayed via said electronic interface; and
   if it is elected to indicate a first left-over food portion of said first food portion, then said first left-over food portion is removed from said plate, said scale measures a first left-over weight of said first left-over food portion by measuring a first weight reduction of said plate and said content of said plate, a first left-over portion nutritious information is calculated based on said first left-over weight and said first nutritious information, an adjusted total portions nutritious information is calculated based on said total portions nutritious information and said first left-over portion nutritious information, and said adjusted total portions nutritious information is displayed via said electronic interface.

* * * * *